3,595,822
LATEX PAINT COMPOSITIONS
Thomas F. Swank, 21 Hitchinpost Road,
Chelmsford, Mass. 01824
No Drawing. Continuation-in-part of application Ser. No.
603,142, Dec. 20, 1966, now Patent No. 3,523,810. This
application Oct. 10, 1969, Ser. No. 865,526
Int. Cl. C09d 5/02; C09c 1/36
U.S. Cl. 260—29.6R                                    9 Claims

ABSTRACT OF THE DISCLOSURE

This disclosure relates to the use of titanium dioxide coated with a boehmite-type alumina having an average crystallite size of at least about 50 angstroms as a pigment in the preparation of gel-resistant latex paint compositions.

---

This application is a continuation-in-part of copending application Ser. No. 603,142, filed Dec. 20, 1966, now U.S. Pat. No. 3,523,810.

This invention relates to new and improved stable, gel-resistant latex paint compositions and to a process for stabilizing latex paint compositions against the undesirable effects resulting from gelation of pigment. More particularly, this invention is concerned with novel latex paint compositions rendered resistant to the effects of pigment gelation by the incorporation therein of titanium dioxide coated with a boehmite-type alumina having an average crystallite size of at least about 50 angstroms as a pigment.

The preparation of pigment grade titanium dioxide by pyrogenic processes such as vapor phase oxidation or hydrolysis of titanium tetrachloride at elevated temperatures has increased significantly in recent years. However, as initially prepared, the titanium dioxide product does not possess optimum properties. As a result, various after-treatment processes have been developed for improving the dispersibility, whiteness and resistance to decomposition by the action of ultra-violet light on titanium dioxide pigments. Generally, the aftertreatment processes involve the deposition of a coating of oxides or hydrates of alumina, titania or silica, or mixtures thereof, onto the surface of the pyrogenic titanium dioxide pigment.

Unfortunately, however, titanium dioxide pigments heretofore prepared, when utilized in a latex paint formulation, result in the preparation of latex paints which generally exhibit a substantial increase in viscosity on aging. Accordingly, although treatment of pyrogenic titanium dioxide with various additives to optimize certain properties is customary, the degree of stability of titanium dioxide-containing latex paint compositions achieved has been less than desired. For example, in U.S. Pat. No. 3,449,271 issued to O'Connor and Bourgault, there is described a process for preparing a titanium dioxide pigment useful in formulating gel-resistant latex paint compositions wherein titanium dioxide is aftertreated first with an alumina and subsequently with a silica. While this is an effective process, it is evident that an additional chemical processing step following the aftertreatment with alumina is required.

It is accordingly a principal object of this invention to provide improved latex paint compositions which exhibit stability toward gelation.

It is a further object of this invention to provide novel latex paints comprising an emulsion of a latex binder in water as a vehicle and a titanium dioxide coated with a boehmite-type alumina having an average crystallite size of at least about 50 angstroms as a pigment.

Other objects and advantages of the present invention will be apparent to those skilled in the art from the following detailed description and claims.

In accordance with this invention, it has been found that the above and still further objects are achieve by incorporating or dispersing with a vehicle of a latex in water emulsion certain titanium dioxide products which have been aftertreated with boehmite-type alumina having an average crystallite size of at least 50 angstroms.

While not intended in any way to be bound by the following explanation, it is believed that such a crystalline boehmite-type alumina deposited on the surface of titanium dioxide prevents any substantial increase in the viscosity of paint compositions containing the titanium dioxide pigment by suppressing any change in the crystal morphology of the alumina during storage of the paint compositions. In particular, it is believed that during such changes in morphology, the long range order of the alumina will increase and link titanium dioxide pigment particles together despite aftertreatment. This linking results in the gelation of the latex paint formulations. Accordingly, when a pigment treated in the manner of the present invention is utilized in formulating a latex paint, the resulting paint exhibits little or no change in viscosity on aging and, therefore, little or no tendency toward gelation.

Generally speaking, the latex paint compositions of this invention comprise an amount of from about 10 to about 90% by weight of the composition of latex binder and an amount of from about 90 to about 10% by weight of the composition of the aftertreated titanium dioxide pigment. In a preferred embodiment, the latex binder is present in an amount of from about 40 to about 60% by weight of the composition and the pigment is present in an amount of from about 60 to about 40% by weight of the composition.

In accordance with the present invention, the term, latex paint, refers generally to an emulsion paint wherein the vehicle is an emulsion of latex in water. More particularly, the latex binder comprises small globules or particles of natural or synthetic rubber or plastic. Specific examples are styrene-butadiene rubber; polyvinyl acetate, copolymers of vinyl acetate with monomers such as butyl acrylate, octyl acrylate, dibutyl fumarate, dioctyl maleate, vinyl propionate and vinyl caprate; and polyacrylate polymers and copolymers such as the copolymer of ethyl acrylate and a suitable alkyl methacrylate.

The pigments utilized in the latex paint compositions of the present invention include titanium dioxide coated with a boehmite-type alumina having an average crystallite size of at least about 50 angstroms. In general, a titanium dioxide pigment coated with an amount of from about 0.5 to about 10% of alumina based on the weight of titanium dioxide is appropriate for practicing the invention. It is preferred, however, to use, as a pigment, titanium dioxide coated with an amount of from about 1.5 to about 6% by weight of alumina.

The titanium dioxide substrate employed in the preparation of the present pigments may be readily prepared by methods well-known in the art. For example, a titanium dioxide product prepared by the sulfate process or the chloride process is suitable although titanium dioxide prepared by the chloride process is particularly advantageous. However, the titanium dioxide starting material utilized in accordance with this invention should have an average particle diameter of between about 150 and about 400 millimicrons. Preferably, a pyrogenic titanium dioxide substrate having an average particle diameter of between about 180 and 300 millimicrons is utilized.

The titanium dioxide pigments having coated thereon boehmite-type alumina having an average crystallite size of at least about 50 angstroms may be prepared by either of two processes, one of which entails the use of a base-yielding aluminum salt such as sodium aluminate and the like, the other of which entails the use of an acid-yielding aluminum salt such as aluminum sulfate and the like.

When utilizing the process involving a base-yielding aluminum salt such as sodium aluminate, calcium aluminate, and the like, the precipitated alumina will be sufficiently well crystallized if the precipitation is carried out at a temperature ranging from about 20 to about 100° C. with neutralizing quantities of an acid such as acetic acid, hydrochloric acid, nitric acid, sulfuric acid, and the like. In this process, the base-yielding aluminum salt is added to a basic slurry of titanium dioxide, for example, a slurry maintained at a pH of from 7 to 10, and preferably at a pH of from 8 to 10. Following a neutralization step to precipitate alumina, the slurry is subjected to a relatively mild aftertreatment. This aftertreatment can be carried out at a pH of from 7 to 10 at a temperature of from about 40° C. or higher for at least 5 minutes. In practice, the higher the temperature used, the shorter the required aftertreatment and the lower the pH required to obtain a desirable boehmite-type alumina crystalline structure. For the purposes of the present invention, the boehmite-type structure of the alumina added by the aftertreatment should be comprised of crystallites having an average diameter of at least 50 angstroms. The size may be measured by X-ray diffraction techniques as interpreted by the Scherrer relationship $$T = \frac{0.9l}{B \cos x}$$

wherein:

T = crystallite size
l = wave-length of X-rays in angstrom units
x = spectrometer angle at which the peak occurs The crystallite sizes disclosed in the working examples herein were obtained by averaging four different values of T. These values were those calculated with angles corresponding to the four major peaks which characterize the boehmite on an X-ray diffraction pattern.

In an alternate process for preparing the particular pigments useful in formulating the latex paints, the crystalline boehmite-type alumina is precipitated by neutralizing an acid solution such as an aluminum sulfate or aluminum chloride solution. The precipitation is readily carried out with organic or inorganic bases, such as sodium carbonate or ammonia, and the like, which will not yield any undesirable precipitate during the neutralization procedure. Furthermore, in the process wherein acidic solutions are neutralizied, it is advantageous to age the boehmite-type alumina coated pigment for a period of from about 1 to 24 hours at a temperature of from about 70 to 100° C. However, a substantially crystalline alumina may be obtained by curing the slurry for about one hour at a temperature of 95° C. As hereinbefore indicated, the use of higher temperatures or higher pH conditions tends to reduce the curing time required to obtain a 50 angstrom crystallite.

Additionally, if desired, a silicate compound may be incorporated as a dispersing aid in a titanium dioxide slurry prior to any aftertreatment process. The amount of additive may vary from about 0.05 to about 4% by weight based on the titanium dioxide.

A further embodiment of the present invention entails applying an initial coating to the titanium dioxide starting material of a hydrate or oxide of titania prior to, simultaneously with, or after the application of the coating of crystalline alumina. Any soluble titanium compound such as titanium tetrachloride, titanium sulfate, tetraethyl titanate and the like can be utilized for the purpose of applying the titania coating. However, titanium tetrachloride is preferred. The amount of hydrate or oxide of titania precipitated onto the titanium dioxide surface should be small because it tends to interfere with the crystallizing of the alumina deposited according to the process of the invention. In general, a coating of between about 0.5 and about 2.5% of titania by weight of the titanium dioxide starting material is entirely suitable.

The invention will be more readily understood by reference to the following examples which describe the use of the pigments of the present invention in the formulation of latex paint compositions. There are, of course, many other forms of this invention which will become obvious to one skilled in the art, once the invention has been fully disclosed, and it will accordingly be recognized that these examples are given for the purpose of illustration only, and are not to be construed as limiting the scope of this invention in any way.

The following illustrate the preparation of titanium dioxide pigments of the present invention as well as the preparation of a conventional titanium dioxide pigment aftertreated with amorphous alumina.

EXAMPLE 1

Into a one-gallon ball mill there are charged 430 grams of water, 20.16 mls. of sodium silicate, and 1000 grams of a titanium dioxide base pigment. The mill is agitated for two hours at 50 r.p.m. with a ball charge of 4.1 lbs. of ¾ inch porcelain balls.

At the end of the two-hour period the ball-milled slurry is discharged and the mill is twice washed with 890 grams of water each time. The wash water is added to the slurry. The pH of the resultant mixture is 10.1.

A quantity of 738 mls. of a 32.7% $Al_2(SO_4)_3 \cdot 18H_2O$ solution is added to the slurry bringing the pH to about 3.35. The slurry is then rapidly neutralized (over about three to four minutes) with 1220 ml. of 13% sodium carbonate. The resultant pH of the slurry is 7.02. The resultant slurry is filtered immediately on a Buchner filter and washed with about 8 liters of water.

The alumina on the titanium dioxide is amorphous and the crystallite size of the alumina is such that the average crystallite diameter is less than 20 angstroms.

EXAMPLE 2

Charged into a ball mill and agitated for 2 hours as described in Example 1 are 430 grams of water, 20.16 mls. of a sodium silicate solution of 0.1 gram sodium silicate per ml., and 1000 grams of a titanium dioxide pigment. The ball-milled slurry, together with the ball-mill wash water as described in Example 1, is heated to 70° C. The pH is determined to be 9.00.

250.5 grams of concentrated $Na_2Al_2O_4$ solution (28.5 grams $Al_2O_3$ per 100 mls. of solution) are added to the slurry bringing the pH to about 10.9. Neutralization is carried out by reducing the pH to 6.97 with HCl over a 25 minute period. The pH is then raised to 9.0 with 13% $Na_2CO_3$. After further heating for 30 minutes at 70° C., the slurry is filtered and the resultant filter cake is washed with 8 liters of water. Washtime is about the same, no faster, than that required in Example 1.

The alumina on the titanium dioxide is highly crystalline in the boehmite form. Average diameter of the boehmite crystallite is 79 angstroms.

EXAMPLE 3

This treatment is designed to impart a co-precipitated aftertreatment on titania, the aftertreatment comprising 5.0% $Al_2O_3$ and 0.2% $SiO_2$.

A one-gallon ball mill is charged with 410 grams of water, 20.2 mls. of a sodium silicate solution (comprising 0.0992 equivalent gram of $SiO_2$ in each ml. of the sodium silicate solution), and 1000 grams of titanium dioxide. After ball-milling for two hours, the slurry is removed and the ball mill is washed with two 890 ml. portions of water which are added to the slurry. The slurry is then heated to 70° C. while being continuously agitated. The pH of the slurry is 9.10.

To this slurry are added 747.4 mls. of an aluminum sulfate solution containing the equivalent of 0.0663 gram of $Al_2O_3$ per ml. of solution. The pH is reduced to 2.57 by this addition. Next, 1200 mls. of a 13% $Na_2CO_3$ solution is added raising the pH to 8.18. After curing for 2 hours at 90% C. the material is washed.

The cake is dried in an oven for about 14 hours at 110° C.

The alumina deposited on the surface of the cake is boehmite but somewhat less crystalline than the alumina deposited in Example 2. Average crystallite diameter of the boehmite is about 65 angstroms.

EXAMPLE 4

A slurry comprising 430 grams of water and 1000 grams of $TiO_2$ is ball milled, augmented with ball-mill wash water and heated to 70° C. as for the preceding examples. The pH of the slurry is 5.88.

747.4 mls. of an aluminum sulfate solution (containing the equivalent of 0.066 gram per ml. of solution) are added to the slurry and the pH drops to about 2.5. After neutralizing to pH 8.13 with 1180 ml. of 13% $Na_2CO_3$, the slurry is heated to 80° C. for 60 minutes.

Average diameter of the boehmite crystallite is 54 angstroms.

EXAMPLE 5

Into a one gallon ball mill there are charged 1430 mls. of water, 7 mls. of a sodium silicate solution containing the equivalent of 0.1 gram $SiO_2$ per ml. and 1000 grams of a titanium dioxide base pigment. The slurry is agitated for two hours with a ball charge of 3750 grams of ¾ inch procelain balls. At the end of the two hour period the ball-milled slurry is discharged and the mill is washed with 758 mls. of water. The wash water is added to the slurry.

To the slurry there are added 39.2 mls. of $TiCl_4$ solution containing an equivalent of 0.32 gram $TiO_2$ per ml., and 472 mls. of an aluminum sulfate solution containing 0.11 gram $Al_2O_3$ per ml. The slurry is heated to a temperature of 70° C. over a period of 77 minutes and 190 mls. of 50% sodium hydroxide is added. The pH of the slurry is adjusted to 9.4 at which pH the slurry is cured for a period of 30 minutes. To the slurry is added 194 grams of an 18% sodium silicate solution and the pH is adjusted to 9.98 where curing for 15 minutes occurs. The pH of the slurry is adjusted to 5.75 with 93% sulfuric acid and is further cured for a period of 20 minutes. The resultant slurry is filtered, washed with about 8 liters of water and dried at a temperature of 105 to 110° C. overnight.

The pigment prepared in this manner comprises a titanium dioxide base substrate coated with 1.25% by weight hydrous titanium dioxide, 5% alumina having a crystallite size greater than 50 angsroms, and 35% silica.

EXAMPLE 6

An aqueous ball-milled slurry containing 1000 grams of titanium dioxide is prepared in accordance with the first paragraph of Example 5. To this slurry there are added 39.2 mls. of $TiCl_4$ containing 0.32 gram $TiO_2$ per ml. and 400 mls. of a sodium silicate solution containing 0.1 gram $SiO_2$ per ml. and the temperature of the slurry is raised to 75° C. Sodium aluminate containing the equivalent of 0.2 gram alumina per ml. is added in an amount of 375 mls. and the pH of the slurry is adjusted to 9.0 with sulfuric acid. The slurry is cured at this pH for a period of 30 minutes and is washed and dried as shown in Example 5.

The recovered pigment is found to comprise a titanium dioxide base pigment coated with 1.25% by weight hydrous titanium dioxide, 4.0% silica and 7.5% alumina, the crystllite size of which alumina is greater than 50 angstroms.

In the following examples the effectiveness of the foregoing pigments as gel-resistant pigments in the formulation and preparation of gel-resistant latex paint compositions is demonstrated.

EXAMPLE 7

The pigments prepared in Examples 1 through 4 are each tested for viscosity stability at 60° C. in a formulation comprising the following ingredients:

| | Grams |
|---|---|
| Masterbatch | 20.0 |
| Igepal CO–630 | 0.6 |
| Pigment | 35.0 |
| Water | 11.5 |

The Masterbatch comprises—

| Material: | Wt. percent |
|---|---|
| $H_2O$ | 92.61 |
| Cellosize | 1.67 |
| Tamol 731 | 2.86 |
| KTPP | 1.43 |
| Polyglycol P1200 | 1.43 |

Cellosize is a trade name designating a hydroxyethyl cellulose sold by Union Carbide Corporation.

Tamol 731 is a trade name designating a dispersant sold by Rohm and Haas Co.

Igepal CO–630 is a trade name designating a nonionic surface active agent sold by General Aniline and Film Corporation.

KTPP is used above to designate potassium tripolyphosphate.

Polyglycol P–1200 is a trade name designating an antifoam agent sold by Dow Chemical Company.

The formulation essentially comprises all of the ingredients of a conventional latex paint except the polymer binder. It is prepared by dispersion on a Cowles mixer in a 100 ml. beaker for 15 minutes and pH adjustment to 9.2 with ammonia. The resultant dispersion is tested in an oven at 60° C.

The titanium dioxide pigment of Example 1, i.e., the control sample coated with alumina having a crystallite size less than 50 angstroms, gels substantially within two days.

The titanium dioxide pigment of Example 2, i.e., the titanium dioxide prepared by precipitating alumina by acidification of a basic solution is substantially free of any troublesome gel for a period of five weeks at which time the test is concluded.

The titanium dioxide pigments of Examples 3 and 4 show very little gel formation upon standing for a few days, however, the gel disappears with slight agitation and does not recur during the test period.

EXAMPLE 8

Each of the titanium dioxide pigments prepared in Examples 5 and 6 is utilized in the preparation of the following latex paint compositions.

The latex paint compositions are prepared by adding the following ingredients in order, with mixing, to a 1000 ml. stainless steel beaker:

| | Grams |
|---|---|
| Masterbatch #1 | 219.0 |
| Lecithin | 4.8 |
| Polyglycol P–1200 | 3.6 |
| $TiO_2$ | 270.0 |
| Snowflake White | 150.0 |
| ASP 400 | 150.0 |
| Cellosize (2%) | 120.0 |

This mixture is ground for 7 minutes at 4400 r.p.m. in a Cowles dissolver. There is obtained a ground paste, a portion of which is utilized in the following composition which is prepared by mixing the ingredients first with a spatula and then wth an electric stirrer:

| | Grams |
|---|---|
| Paste | 764.5 |
| Cellosize (2%) | 110.0 |
| Carbitol | 15.0 |
| Polyco 804 | 229.0 |
| Masterbatch #2 | 70.3 |
| Troykyd 333 | 3.0 |

The above formulation is adjusted to a pH of 9.2 with 14% ammonia and the latex paints are tested for viscosity stability.

The ingredients employed in preparing the foregoing latex paint compositions are defined in more detail as follows.

| Masterbatch #1: | Grams |
|---|---|
| Water | 2688.0 |
| KTPP | 8.4 |
| Tamol 731 (25%) | 117.6 |
| Ethylene glycol | 252.0 |
| | 3066.0 |

| Masterbatch #2: | |
|---|---|
| Water | 1176.0 |
| PMA–18 | 4.2 |
| | 1180.2 |

Snowflake White is a trade name designating a calcium carbonate filler sold by Thompson, Weinman and Co.

ASP 400 is a registered trademark of Minerals and Chemicals Corp of America for an aluminum silicate pigment.

Carbitol is a registered trademark of Union Carbide Corporation for diethylene glycol monoethyl ether.

Polyco 804 is a registered trademark of Borden Company for emulsions and solutions of polyvinyl acetate homopolymers and copolymers.

Troykyd 333 is a trade name designating an antifoam agent sold by Troy Chemical Company.

PMA–18 is a trade name of Troy Chemical Company for an 18% solution of phenylmercuric acetate.

The latex paint compositions prepared in accordance with the above procedure and utilizing the titanium dioxide pigments of Examples 5 and 6 are placed in a circulating air oven which is maintained at 140° F. After a period of 5 days at 140° F., the latex paint compositions are removed from the circulating oven and allowed to come to room temperature. Upon careful examination, it is found that the latex paint compositions prepared with titanium dioxide pigments coated with a boehmite-type alumina having an average crystallite size of at least about 50 Angstroms are not gelled. In particular, the latex paint composition prepared with the titanium dioxide of Example 5 increased from an initial viscosity of 81 to a viscosity of only 82 after the five-day test period. In the instance of the latex paint composition prepared with the titanium dioxide pigment of Example 6, the latex stability test showed an increase in viscosity to 91 from an initial viscosity of 87, after the five-day test period.

EXAMPLE 9

There are charged into a one gallon ball mill 2330 mls. of water, 7 mls., of a sodium silicate solution containing the equivalent of 0.1 gram $SiO_2$ per ml. and 1000 grams of a titanium dioxide base pigment. The slurry is agitated for two hours with a ball charge of 3770 grams of ¾ inch porcelain balls. At the end of the two hour period the ball-milled slurry is discharged and the mill is washed with 660 mls. of water. The wash water is added to the slurry.

The slurry is heated to 70° C. and there are added to the heated slurry 32.2 mls. of $TiCl_4$ solution containing an equivalent of 0.31 gram $TiO_2$ per ml., 250 mls. of 10% sodium silicate solution, 472 mls. of an aluminum sulfate solution containing 0.11 gram $AlO_2$ per ml. and 1055 mls. of 2.7 N sodium carbonate. The slurry which has a pH of 7.0 is cured for 30 minutes. The resultant slurry is filtered, washed with about 8 liters of water and dried.

The pigment obtained comprises a titanium dioxide base substrate coated with 1% by weight hydrous titania, 2.5% by weight silica and 5% by weight alumina having a crystallite size less than 50 Angstroms. When utilized as a pigment in the latex paint formulation of Example 8, the viscosity increased from 82 to 127 after the five-day test period.

EXAMPLE 10

There are charged into a one gallon ball mill 2330 mls. of water, 7 mls. of a sodium silicate solution containing the equivalent of 0.1 gram $SiO_2$ per ml. and 1000 grams of a titanium dioxide base pigment. The slurry is agitated for two hours with a ball charge of 3770 grams of ¾ inch porcelain balls. At the end of the two hour period the ball-milled slurry is discharged and the mill is washed with 660 mls. of water. The wash water is added to the slurry.

The slurry is heated to 70° C. and there are added to the heated slurry 32.2 mls. of $TiCl_4$ solution containing an equivalent of 0.31 gram $TiO_2$ per ml., 250 mls. of an aluminum sulfate solution containing 0.1 gram $Al_2O_3$ per ml. and 1425 mls. of 2.7 N sodium carbonate. The slurry which has a pH of 9.0 is cured for 60 minutes. The resultant slurry is filtered, washed with about 8 liters of water and dried.

The resultant pigment comprises a titanium dioxide base substrate coated with 1% by weight hydrous titania, 2.5% by weight silica and 5% by weight alumina having a crystallite size greater than 50 Angstroms. When utilized as a pigment in the latex paint formulation of Example 8, the viscosity increased from 80 to only 87 after the five-day test period.

While this invention has been described with respect to certain embodiments, it is not so limited, and it should be understood that variations and modifications thereof may be made which are obvious to those skilled in the art without departing from the spirit or scope of the invention.

The embodiments of the invention in which an exclusive property or privilege is claimed are defined as follows:

1. A latex paint composition comprising a latex binder selected from the group consisting of natural rubber, synthetic rubber and plastics in an amount of from about 10 to about 90% by weight of the composition and as a pigment titanium dioxide coated with an amount of 0.5 to 10%, based on the weight of the titanium diixide, of a boehmite-type alumina having an average crystallite size of at least about 50 Angstroms in an amount of from about 90 to about 10% by weight of the composition.

2. A latex paint composition as defined in claim 1 wherein the latex binder is present in an amount of from about 40 to about 60% by weight of the composition and the pigment is present in an amount of from about 60 to about 40% by weight of the composition.

3. A latex paint composition as defined in claim 1 wherein the titanium dioxide is a pyrogenic titanium dioxide having an average particle diameter of between about 150 and about 400 millimicrons.

4. A latex paint composition as defined in claim 1 wherein the titanium dioxide is a pyrogenic titanium dioxide having an average particle diameter of between about 180 and about 300 millimicrons.

5. A latex paint composition as defined in claim 1 wherein the titanium dioxide is coated with an amount of from about 1.5 to about 6% of alumina based on the weight of the titanium dioxide.

6. A latex paint composition as defined in claim 1 wherein the titanium dioxide is additionally coated with a hydrate or oxide of titanium dioxide in an amount of from about 0.5 to about 2.5% by weight of the titanium dioxide.

7. A latex paint composition as defined in claim 1 wherein the titanium dioxide is additionally coated with an insoluble hydrous silica in an amount of from about 0.05 to about 4% by weight of the titanium dioxide.

8. A latex paint composition as defined in claim 1 wherein the titanium dioxide is additionally coated with a hydrate or oxide of titanium dioxide in an amount of from about 0.5 to about 2.5% by weight of the titanium dioxide and with an insoluble hydrous silica in an amount of from about 0.05 to about 4% by weight of the titanium dioxide.

9. A latex paint composition as defined in claim 1 wherein the latex binder is selected from the group consisting of styrene-butadiene rubber, polyvinyl acetate, vinyl acetate-butyl acrylate copolymer, vinyl acetate-octyl acrylate copolymer, vinyl acetate-dibutyl fumarate copolymer and vinyl acetate-dioctyl maleate copolymer.

References Cited

UNITED STATES PATENTS

| | | | |
|---|---|---|---|
| 3,239,475 | 3/1966 | Clark | 260—17 |
| 3,334,059 | 8/1967 | Rodgers | 260—29.6 |
| 3,400,093 | 9/1968 | Feinberg | 260—29.6EM |
| 3,449,271 | 6/1969 | O'Connor | 106—300X |
| 3,481,889 | 12/1969 | Gibsen | 260—29.6EM |

TOBIAS E. LEVOW, Primary Examiner

H. M. SNEED, Assistant Examiner

U.S. Cl. X.R.

106—300, 308B